US012627466B2

(12) United States Patent
Adolphe et al.

(10) Patent No.: US 12,627,466 B2
(45) Date of Patent: May 12, 2026

(54) LOW-OBSERVABLE ENCRYPTION DEVICE FOR FACILITATING COMMUNICATIONS

(71) Applicant: Forward Edge-AI, Inc., San Antonio, TX (US)

(72) Inventors: Eric Adolphe, San Antonio, TX (US); Riaan Gouws, San Antonio, TX (US); Benjamin Tullis, San Antonio, TX (US); Thomas Summe, San Antonio, TX (US)

(73) Assignee: Forward Edge-AI, Inc., San Antonio, TX (US)

( * ) Notice: Subject to any disclaimer, the term of this patent is extended or adjusted under 35 U.S.C. 154(b) by 57 days.

(21) Appl. No.: 18/616,048

(22) Filed: Mar. 25, 2024

(65) Prior Publication Data

US 2025/0047463 A1    Feb. 6, 2025

Related U.S. Application Data

(63) Continuation-in-part of application No. 18/464,985, filed on Sep. 11, 2023, and a continuation-in-part of
(Continued)

(51) Int. Cl.
*H04L 9/06* (2006.01)

(52) U.S. Cl.
CPC ................................. *H04L 9/0618* (2013.01)

(58) Field of Classification Search
CPC  H04L 9/0618; H04L 63/0428; H04L 63/0471
See application file for complete search history.

(56) References Cited

U.S. PATENT DOCUMENTS 6,253,321 B1 * 6/2001 Nikander .............. H04L 63/164
713/168
6,393,456 B1    5/2002 Ambler et al.
(Continued)

FOREIGN PATENT DOCUMENTS

| CN | 203840359 U | 9/2014 |
| CN | 113158179 A | 7/2021 |
| WO | 2017058183 A1 | 4/2017 |

OTHER PUBLICATIONS

C. Hennebert and J.D. Santos, "Security Protocols and Privacy Issues into 6LoWPAN Stack: A Snthesis," in IEEE Internet of Things Journal, vol. 1, No. 5, pp. 384-398, Oct. 2014.
(Continued)

*Primary Examiner* — Han Yang

(74) *Attorney, Agent, or Firm* — Hunton Andrews Kurth LLP

(57) ABSTRACT

An apparatus, system, and methods to use a low-observable encryption device that includes an encryption unit; a communication unit; and a computing unit, wherein a microprocessor comprises two encryption units. The low-observable encryption device may also include an interchangable device. In some embodiments, the interchangable device comprises a computing unit, a software defined radio, an electrical to optical converter, or a combination thereof. In some embodiments, power is delivered by a USB port. In some embodiments, an input interconnect comprises an Ethernet interface, a USB interface, a Wi-Fi interface, a radio interface, a SATCOM interface, or a Bluetooth interface. In some embodiments, an output interconnect comprises an Ethernet interface, a USB interface, a Wi-Fi interface, a radio interface, a SATCOM interface, or a Bluetooth interface.

20 Claims, 7 Drawing Sheets

Related U.S. Application Data application No. 18/354,387, filed on Jul. 18, 2023, and a continuation-in-part of application No. 18/345,080, filed on Jun. 30, 2023, and a continuation-in-part of application No. 18/326,633, filed on May 31, 2023, and a continuation-in-part of application No. 18/309,323, filed on Apr. 28, 2023, now Pat. No. 12,255,995, and a continuation-in-part of application No. 18/309,289, filed on Apr. 28, 2023, now Pat. No. 12,395,476.

(56) References Cited

U.S. PATENT DOCUMENTS

| | | | |
|---|---|---|---|
| 11,188,046 | B1 | 11/2021 | ElHattab et al. |
| 11,588,789 | B2 | 2/2023 | Kerseboom et al. |
| 11,588,798 | B1 * | 2/2023 | Cline ................. H04L 63/0272 |
| 12,088,569 | B1 * | 9/2024 | Cline ..................... H04L 45/74 |
| 12,199,958 | B1 | 1/2025 | Layton et al. |
| 2012/0201383 | A1 * | 8/2012 | Matsuo ..................... H04L 9/12 |
| | | | 380/255 |
| 2015/0009991 | A1 | 1/2015 | Sung et al. |
| 2018/0159765 | A1 | 6/2018 | Shi et al. |
| 2019/0166152 | A1 | 5/2019 | Steele et al. |
| 2021/0364645 | A1 | 11/2021 | Kim et al. |
| 2022/0272122 | A1 | 8/2022 | Kaabouch et al. |
| 2022/0385567 | A1 | 12/2022 | Zhang et al. |
| 2023/0095149 | A1 | 3/2023 | Nawaz |
| 2023/0138458 | A1 | 5/2023 | Wei et al. |

OTHER PUBLICATIONS

Gnanavel, S., Narayana, K. E., Jayashree, K., Nancy P., Teressa, Dawit Mamiru, Implementation of Block-Level Double Encryption Based on Machine Learning Techniques for Attack Detection and Prevention, Wireless Communications and Mobile Computing, 2022, 4255220 9 pages, Year: 2022.

M. Mushtaq et al., "Whisper: A Tool for Run-Time Detection of Side-Channel Attacks," in IEEE Access, vol. 88, p. 83871-83900, Year: 2020.

Naeem Firdous Syed, Zubair Baig, Ahmed Ibrahim & Crag Valli (2020), Denial of Service Attack Detection Through Machine Learning for the IIT, Journal of Information and Telecommunication, 4:4, pp. 482-503, Year: 2020.

"Simple Encryption Procedure for Internet of Things (IoT) Environments," Telecommunication Standardized Sector of ITU X, 1362, obtained online from ,https://www.itu.int/rec/dologin_pub. asp?lang=e&id=T-REC-X.1362-201703-1!PDF-E&type=items>, retrieved on Jul. 26, 2025, Year: 2017.

Thakkar, A., Lohiya, R. A Review on Machine Learning and Deep Learning Perspectives of IDS for IoT: Recent Updates, Security Issues, and Challenges. Arch Computat Methods Eng 28, 3211-3243, Year: 2021.

* cited by examiner

LOW-OBSERVABLE ENCRYPTION DEVICE FOR FACILITATING COMMUNICATIONS

CROSS-REFERENCE TO RELATED APPLICATIONS

The current application is a continuation-in-part (CIP) application of U.S. nonprovisional application Ser. No. 18/309,289 filed on Apr. 28, 2023, U.S. nonprovisional application Ser. No. 18/309,323 filed on Apr. 28, 2023, U.S. nonprovisional application Ser. No. 18/326,633 filed on May 31, 2023, U.S. nonprovisional application Ser. No. 18/345, 080 filed on Jun. 30, 2023, U.S. nonprovisional application Ser. No. 18/354,387 filed on Jul. 18, 2023, and U.S. nonprovisional application Ser. No. 18/464,985 filed on Sep. 11, 2023. All six of these applications are incorporated by reference herein in their entirety.

GOVERNMENT INTEREST

This invention was made with Government support under the Small Business Technology Transfer (STTR) Funding Agreement Number FA864923P0397 awarded by the U.S. Air Force Research Laboratory, AFWERX. The Government has certain rights in this invention.

FIELD

This disclosure relates to data processing including the features and use of a low observable encryption device for facilitating communications.

BACKGROUND

Existing encryption devices may allow adversaries eavesdrop on data traffic and other communication. Multiple devices may work together to reduce this risk, but they are not flawless. Some devices are geolocatable using triangulation and trilateration requiring additional devices to obfuscate location information. Elegant, effective devices and methods are needed.

SUMMARY

This summary is provided to comply with 37 C.F.R. § 1.73, requiring a summary of the invention briefly indicating the nature and substance of the invention. It is submitted with the understanding that it will not be used to interpret or limit the scope or meaning of the claims.

In one embodiment, a low-observable encryption device includes an encryption unit configured to encrypt an egressing native packet using an encryption key, create an encrypted egressing native packet, and add a connectionless header to form an egressing connectionless datagram; a communication unit configured to couple and communicate with the encryption unit, receive the egressing connectionless datagram, and add a complex header to the egressing connectionless datagram to form an egressing packet; and a computing unit configured to couple and communicate with the communication unit, establish a communication session between the computing unit and an external computing unit of an external encryption device, transmit an identifier list comprising an identifier, a number of identifiers, and an identifier selecting parameter, select an identifier from the identifier list, receive the egressing packet from the communication unit, and forward the egressing packet to the external computing unit through a path identified from a plurality of paths for a time interval based on the identifier list and the identifier selecting parameter, wherein a microprocessor comprises two encryption units. The low-observable encryption device may also include an interchangable device. In some embodiments, the interchangable device comprises a computing unit, a software defined radio, an electrical to optical converter, or a combination thereof. In some embodiments, the encryption units, communication unit, and computing unit are on one side of a trust barrier. The interchangeable device may be on the same side of a trust barrier as interconnects IC1 and IC3, an isolated power, and an electrical to optical converter. The microprocessor, interconnects communicating with the microprocessor, Faraday cage, and galvanic isolator may be on the same side of a trust barrier. In some embodiments, power is delivered by a USB port. In some embodiments, an input interconnect comprises an Ethernet interface, a USB interface, a Wi-Fi interface, a radio interface, a SATCOM interface, or a Bluetooth interface. In some embodiments, an output interconnect comprises an Ethernet interface, a USB interface, a Wi-Fi interface, a radio interface, a SATCOM interface, or a Bluetooth interface.

In one embodiment, a system includes a low-observable encryption device, including an encryption unit configured to encrypt an egressing native packet using an encryption key, create an encrypted egressing native packet, and add a connectionless header to form an egressing connectionless datagram, a communication unit configured to couple and communicate with the encryption unit, receive the egressing connectionless datagram, and add a complex header to the egressing connectionless datagram to form an egressing packet; a computing unit configured to couple and communicate with the communication unit, establish a communication session between the computing unit and an external computing unit of an external encryption device, transmit an identifier list comprising an identifier, a number of identifiers, and an identifier selecting parameter, select an identifier from the identifier list, receive the egressing packet from the communication unit, and forward the egressing packet to the external computing unit through a path identified from a plurality of paths for a time interval based on the identifier list and the identifier selecting parameter; and an interchangable device. In some embodiments, a microprocessor comprises two encryption units.

FIGURES

Aspects, features, benefits and advantages of the embodiments described herein will be apparent with regard to the following description, appended claims, and accompanying drawings where:

DETAILED DESCRIPTION

Embodiments herein relate to a system, devices, and methods to establish resilient data transport with lower likelihood of security risks. Embodiments herein relate to a low-observable encryption device that may implement a protocol free encryption device (PFED) such as that disclosed in U.S. Pat. No. 11,588,798 issued on Feb. 21, 2023 from U.S. patent application Ser. No. 17/200,468, entitled "PROTOCOL FREE ENCRYPTING DEVICE," filed Mar. 12, 2021. Both the application and patent are incorporated herein by reference in their entirety. The protocol free encryption device (PFED) may be implemented as an encryption retransmission device in the low-observable encryption device.

Figure 1:
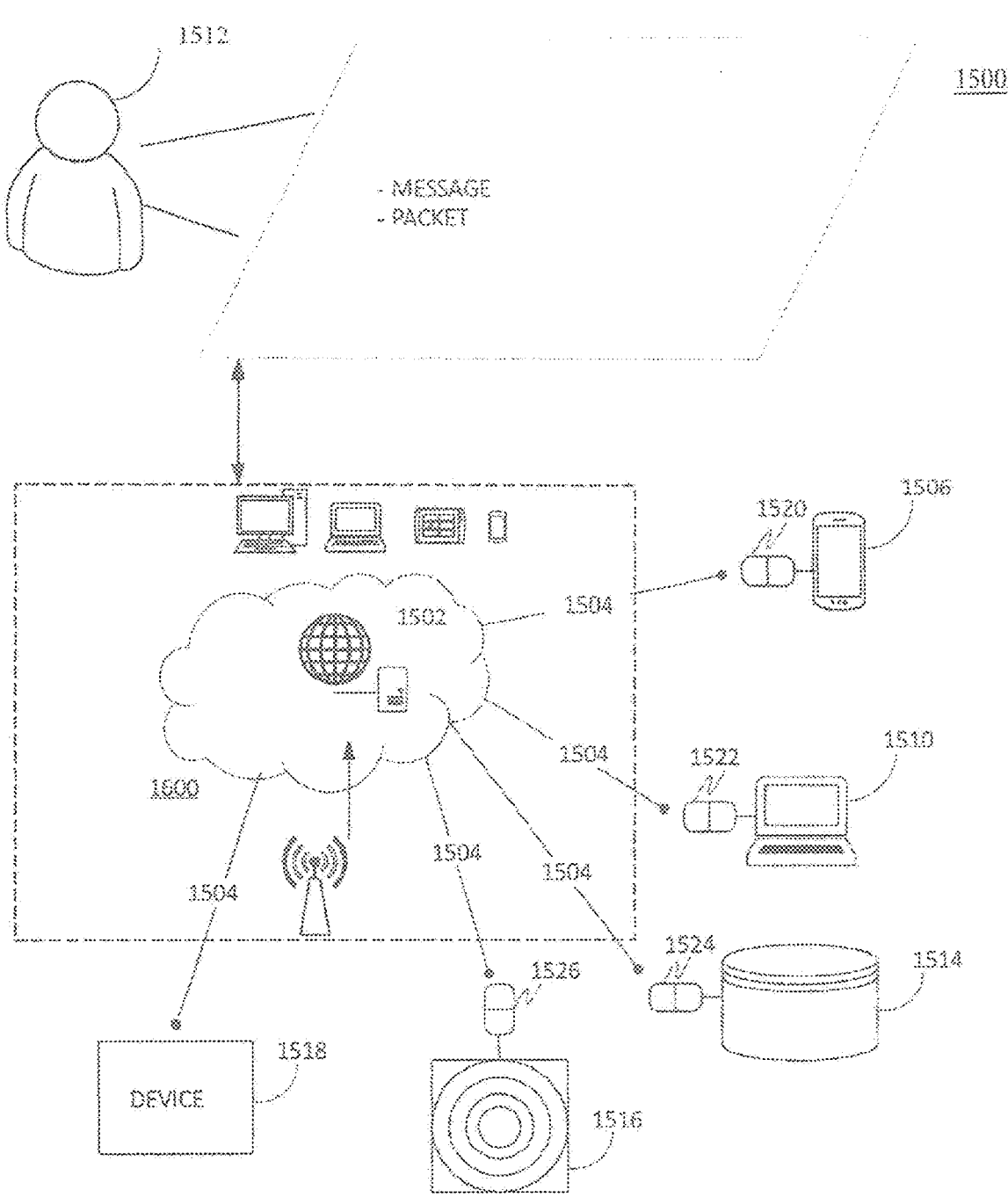
FIG. 1 is a schematic view of an embodiment of a system.

FIG. 1 is an illustration of an online platform 1500 consistent with various embodiments. The online platform 1500 to facilitate communications using a low-observable encryption device may be hosted on a centralized server 1502, such as, for example, a cloud computing service. The centralized server 1502 may communicate with other network entities, such as, for example, a mobile device 1506 (such as a smartphone, a laptop, a tablet computer, etc.), other electronic devices 1510 (such as desktop computers, server computers, etc.), databases 1514, sensors 1516, and a device 1518 (such as the low-observable encryption device) over a communication network 1504, such as, but not limited to, the Internet. Further, the mobile device 1506 may be connected with a first encryption device 1520, the electronic device 1510 may be connected with a second encryption device 1522, the databases 1514 may be connected with a third encryption device 1524, the sensors 1516 may be connected with a fourth encryption device 1526. Further, the network entities may communicate with each other using an encryption device (such as an Isidore™ device, an Isidore™ quantum device, a low-observable encryption device, etc. which are commercially available from ForwardEdge AI of San Antonio, TX) connected to each network entity. Users of the online platform 1500 may include relevant parties such as, but not limited to, end-users, administrators, service providers, service consumers, and so on. Accordingly, in some instances, electronic devices operated by the one or more relevant parties may be in communication with the platform.

A user 1512, such as the one or more relevant parties, may access online platform 1500 through a web-based software application or browser. The web-based software application may be embodied as, for example, but not be limited to, a website, a web application, a desktop application, and a mobile application compatible with a computing device 1600.

Figure 2:
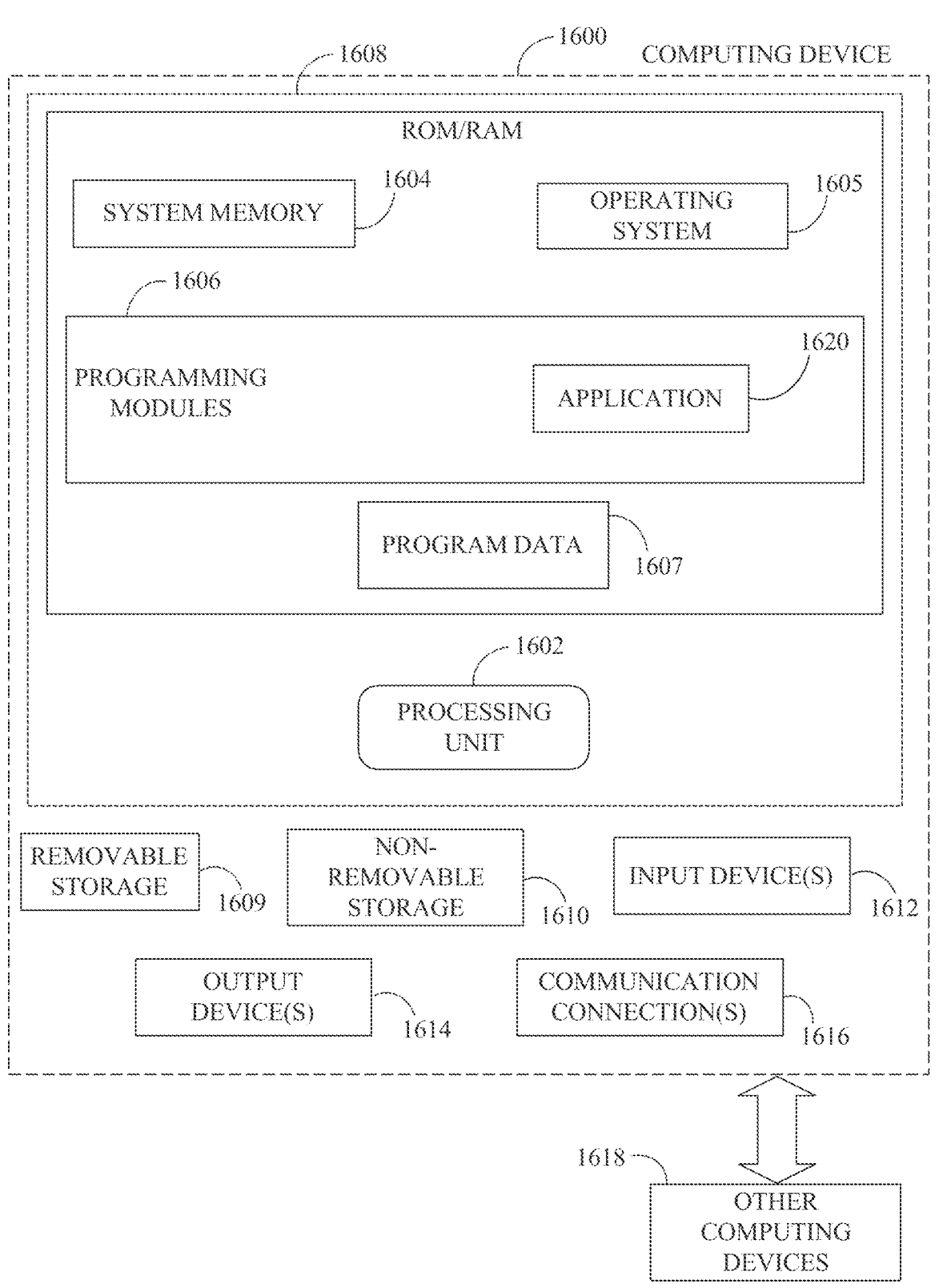
FIG. 2 is a schematic view of an embodiment of a system.

FIG. 2 shows a system consistent with an embodiment of the disclosure may include a computing device or cloud service, such as computing device 1600. In a basic configuration, computing device 1600 may include a processing unit 1602 and a system memory 1604. Depending on the configuration and type of computing device, system memory 1604 may comprise, but is not limited to, volatile (e.g., random-access memory (RAM)), non-volatile (e.g., read-only memory (ROM)), flash memory, or any combination. System memory 1604 may include operating system 1605, one or more programming modules 1606, and may include a program data 1607. Operating system 1605 may be suitable for controlling computing device 1600's operation. In one embodiment, programming modules 1606 may include a machine learning module. Furthermore, embodiments of the disclosure may be practiced in conjunction with a graphics library, other operating systems, or any other application program and is not limited to any particular application or system. This basic configuration is illustrated in FIG. 2 by those components within a dashed line 1608.

Computing device 1600 may have additional features or functionality. For example, computing device 1600 may also include additional data storage devices (removable and/or non-removable) such as, for example, magnetic disks, optical disks, or tape. Such additional storage is illustrated in FIG. 2 by a removable storage 1609 and a non-removable storage 1610. Computer storage media may include volatile and non-volatile, removable and non-removable media implemented in any method or technology for storage of information, such as computer-readable instructions, data structures, program modules, or other data. System memory 1604, removable storage 1609, and non-removable storage 1610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1600. Any such computer storage media may be part of device 1600. Computing device 1600 may also have input device(s) 1612 such as a keyboard, a mouse, a pen, a sound input device, a touch input device, a location sensor, a camera, a biometric sensor, etc. Output device(s) 1614 such as a display, speakers, a printer, etc. may also be included. The aforementioned devices are examples and others may be used.

Computing device 1600 may also contain a communication connection 1616 that may allow device 1600 to communicate with other computing devices 1618, such as over a network in a distributed computing environment, for example, an intranet or the Internet. Communication connection 1616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. For example, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1604, including operating system 1605. While executing on processing unit 1602, programming modules 1606 may perform processes including, for example, one or more stages of methods, algorithms, systems, applications, servers, databases as described above. The aforementioned process is an example, and processing unit 1602 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Figure 3:
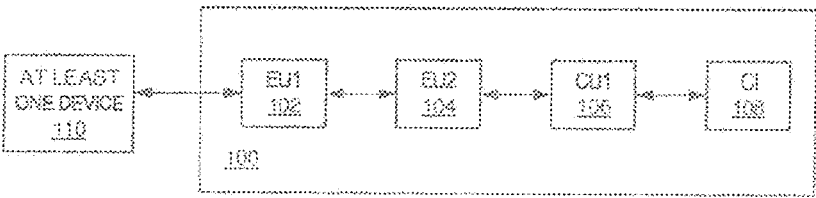
FIG. 3 is a block diagram of components of an embodiment of a system.

FIG. 3 is a block diagram of a low-observable encryption device 100 for facilitating communications, in accordance with some embodiments. The low-observable encryption device 100 may include an encryption unit 102, an encryption unit 104, a communication unit 106, and a computing unit 108. Further, the communication may be low-observable communications.

The combined encryption unit (such as an encryption unit 1 (EU1) 102 and an encryption unit 2 (EU2) 104) 102-104 may be configured for encrypting an egressing native packet received from a device 110 using an encryption key to create an encrypted egressing native packet. The device 110 may include a user device (such as a smartphone, a tablet, a laptop, a desktop, etc.), a client device, etc. The device 110 may be a trusted element. The device 110 may generate the egressing native packet which is a data packet. The encryption unit 102-104 may be configured for adding a connectionless header to the encrypted egressing native packet to form an egressing connectionless datagram. The encryption unit 102-104 may include a computing device, a System on Chip (SoC), etc.

Figure 4:
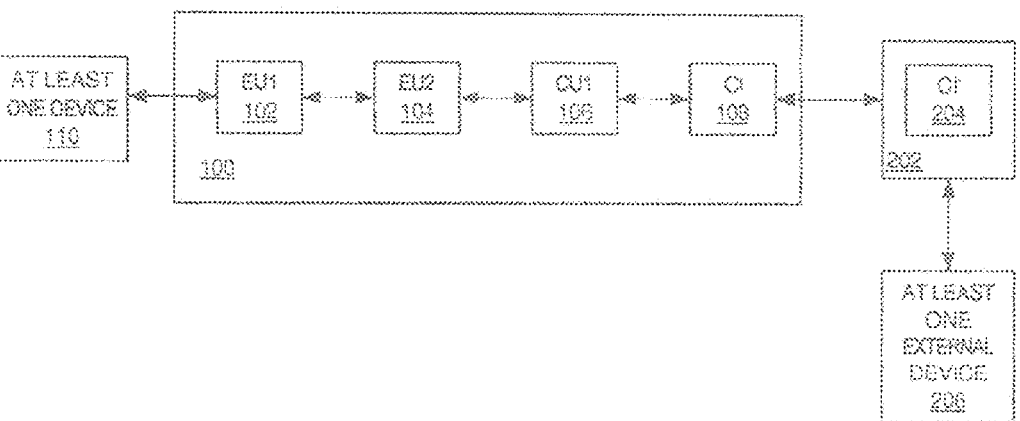
FIG. 4 is a block diagram of components of an embodiment of a system.

The communication unit (such as a communication unit 1 (CU1)) 106 may be communicatively coupled with the encryption unit 102-104. The communication unit 106 may be configured for receiving the egressing connectionless datagram. The communication unit 106 may be configured for adding a complex header to the egressing connectionless datagram for forming an egressing packet. The communication unit 106 may include a computing device, a System on Chip (SoC), etc. The computing unit 108 may be communicatively coupled with the communication unit 106. The computing unit 108 may be a compute infrastructure (CI). The computing unit 108 may be configured for establishing a communication session between the computing unit 108 and an external computing unit 204 of an external encryption device 202, as shown in FIG. 4. The external computing unit 204 may be an external compute infrastructure (CI').

FIG. 4 is a block diagram of the low-observable encryption device 100 with an encryption device, in accordance with some embodiments. A communication session may include a Secure Sockets Layer (SSL) session. The computing unit 108 may be configured for transmitting an identifier list comprising a number of identifiers in each of the identifier list and an identifier selecting parameter to the external computing unit 204. Each of the computing unit 108 and the external computing unit 204 may be configured for selecting an identifier from the number of identifiers comprised in each of the identifier list for identifying a path from a plurality of paths for a time interval based on the identifier list and the identifier selecting parameter for communicating packets during the time interval between the low-observable encryption device 100 and the external encryption device 202. The communicating of the packets (such as the ingressing packet, the egressing packet, etc.) may form a traffic of the low-observable encryption device 100. The transmitting of the identifier list comprising the number of identifiers in each of the identifier list and the identifier selecting parameter to the external computing unit 204 allows the low-observable encryption device 100 and the external encryption device 202 to exchange the identifier list comprising the number of identifiers in each of the identifier list, and the identifier selecting parameter. The identifier list may include a list of mobile equipment identifier (MEID) numbers, a list of media access control (MAC) numbers, a list of user datagram protocol (UDP) port numbers, etc. The number of identifiers may be 100. Further, the identifier selecting parameter may be associated with at least one value that dictates the selecting of the identifier from the number of identifiers comprised in each of the identifier list.

Figure 5:
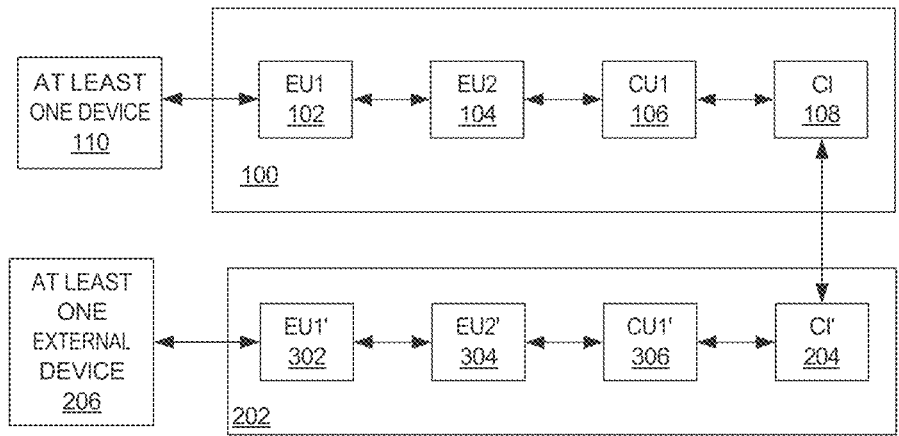
FIG. 5 is a block diagram of components of an embodiment of a system.

The computing unit 108 may be configured for receiving the egressing packet from the communication unit 106. The computing unit 108 may be configured for forwarding the egressing packet received from the communication unit 106 to the external computing unit 204 of the external encryption device 202 through the path based on the identifying. The path corresponds to a specific routing and directing of the egressing packet for the forwarding of the egressing packet. In some embodiments, the time interval may include a twenty-minute interval. The external encryption device 202 may be communicatively coupled with external device 206 as shown in FIG. 4. The external encryption device 202 may include an Isidore™ device, an Isidore™ quantum device, a low-observable encryption device, etc. The external device 206 may include a smartphone, a tablet, a laptop, a desktop, a client device, etc. The external device 206 may be an untrusted element. In some embodiments, the external encryption device 202 decrypts the egressing packet to obtain the egressing native packet and transmits the egressing native packet to the external device 206 for facilitating the communications. In an embodiment, the external encryption device 202 may include an external communication unit (CU1') 306 communicatively coupled with the external compute infrastructure (CI') 204 and external encryption unit 302-304 (an external encryption unit (EU1') 302 and an external encryption unit 2 (EU2') 304) communicatively coupled with the external communication unit 306, as shown in FIG. 5. FIG. 5 is a block diagram of the low-observable encryption device 100 with the encryption device, in accordance with some embodiments. The external device 206 may be communicatively coupled with the external encryption unit 302-304.

Figure 6:
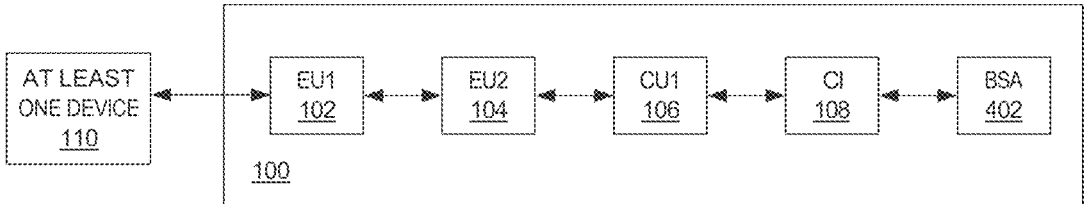
FIG. 6 is a block diagram of components of an embodiment of a system.

The computing unit 108 may be configured for receiving an ingressing packet forwarded by the external computing unit 204, through the path during the time interval. The ingressing packet may include an encrypted ingressing native packet and a complex header. The communication unit 106 may be configured for removing the complex header from the ingressing packet received from the computing unit 108. The communication unit 106 may be configured for adding a connectionless header to the ingressing packet for forming an ingressing connectionless datagram. The ingressing connectionless datagram may include the encrypted ingressing native packet. The encryption unit 102-104 may be configured for receiving the ingressing connectionless datagram. The encryption unit 102-104 may be configured for decrypting the encrypted ingressing native packet comprised in the ingressing connectionless datagram using the at least one encryption key to obtain an ingressing native packet. Further, the ingressing native packet may be transmitted to the device 110. The external device 206 may generate the ingressing native packet. The external encryption device 202 may form the ingressing packet from the ingressing native packet. The low-observable encryption device 100 may include a beam steering antenna 402, as shown in FIG. 6, coupled with the computing unit 108. FIG. 6 is a block diagram of the low-observable encryption device 100 comprising the beam steering antenna 402, in accordance with some embodiments.

Further, the beam steering antenna 402 may be connected to the computing unit 108 by physically connecting the beam steering antenna 402 to the computing unit 108, externally attaching the beam steering antenna 402 to the computing unit 108, and embedding the beam steering antenna 402 into the computing unit 108, etc. The beam steering antenna 402 may include a beam forming antenna and its housing. The computing unit 108 may be configured for determining a power and a transmission angle at an instance for a signal corresponding to the egressing packet. The determining of the power and the transmission angle is based on analyzing information associated with a communication of the packets during the time interval. The computing unit 108 stores the information. The signal may include a radiofrequency (RF) signal. The computing unit 108 may include a modem unit for converting the egressing packet into the radio frequency signal by performing one or more modulations on the egressing packet. The computing unit 108 may be configured for generating a first value for power control parameter associated with the beam steering antenna 402 and a second value for a transmission angle parameter associated with the beam steering antenna 402 based on the determining.

The power and the transmission angle may be varied based on the first value of the power control parameter and the second value of the transmission angle parameter. The beam steering antenna 402 may be configured for broadcasting the signal with the power and the transmission angle at the instance based on the first value of the power control parameter and the second value of the transmission angle parameter. The broadcasting may include radiating electromagnetic waves corresponding to the signal. The forwarding may be based on the broadcasting. The power corresponds to a gain of the signal and the transmission angle corresponds to a beam direction or beam steering of the signal. The gain and the beam direction characterize the signal. The beam steering antenna 402 may include an array of antenna elements. Each of the array of antenna elements may include a power amplifier and a phase shifter. The power amplifier adjusts an amplitude of a signal corresponding to each of the array of antenna elements based on the first value and the phase shifter adjusts a phase of a signal corresponding to each of the array of antenna elements based on the second value. The signal may include a plurality of signals comprising the signal corresponding to each of the array of antenna elements for a plurality of antenna elements in the array of antenna elements.

The computing unit 108 may be configured for obtaining location obfuscating information. The computing unit 108 stores the location obfuscating information associated with an obfuscating of a location (geolocation) of the low-observable encryption device 100. Further, the computing unit 108 may be configured for analyzing the location obfuscating information. The computing unit 108 may be configured for determining location obfuscating requirement for the low-observable encryption device 100 based on the analyzing of the location obfuscating information. The determining of the power and the transmission angle at the instance may be based on the location obfuscating requirement.

In some embodiments, the plurality of paths corresponds to a combination of the identifier from the number of identifiers from the identifier list. Each of the plurality of paths may be unique.

The computing unit 108 may be configured for adding at least one of a header and a declaration associated with an internet standard to the egressing packet for embedding the egressing packet. The forwarding of the egressing packet may be based on the embedding. The internet standard may include HyperText Markup Language (HTML), Multipurpose Internet Mail Extensions (MIME), etc. The header may include HTML5. The declaration may include an MIME declaration.

The computing unit 108 may be configured for initiating a next time interval. The initiating of the next time interval terminates the time interval. Further, the computing unit 108 may be configured for selecting a next identifier from the number of identifiers comprised in the identifier list for identifying a next path from the plurality of paths for the next time interval succeeding the time interval based on the identifier list and the identifier selecting parameter for the communicating of packets during the next time interval between the low-observable encryption device 100 and the external encryption device 202. The next path may differ from the path.

The computing unit 108 may be configured for generating a packet of information associated with the egressing packet based on the receiving of the egressing packet. The packet information may include a number of packets transmitted by the communication unit 106 to the computing unit 108 during a duration. The receiving of the egressing packet by the computing unit 108 corresponds to a behavior of the low-observable encryption device 100. The computing unit 108 may be configured for analyzing the packet information using a machine learning model. The machine learning model may be trained on a plurality of historical packet information associated with a plurality of historical egressing packets received by the computing unit 108 from the communication unit 106 for learning a pattern of life for the low-observable encryption device 100. The pattern of life corresponds to a normal behavior of the low-observable encryption device 100 wherein the machine learning model may be configured for detecting an anomaly in the behavior in relation to the normal behavior. The initiating of the next time interval may be based on the detecting of the anomaly. The machine learning model may be an unsupervised machine learning model comprised of a convolution neural network, a recurrent neural network, a support vector machine, etc. The machine learning model may be trained using an algorithm of an anomaly detector (AD). The computing unit 108 may include the anomaly detector.

The computing unit 108 may be a System on Chip (SoC). The SoC may include a processing unit, a memory, input and output ports, peripheral interfaces, secondary storage devices, modems, a timing device, etc. The encryption unit 102-104 may include two encryption units. Further, the two encryption units may include the encryption unit 1 (EU1) 102 and the encryption unit 2 (EU2) 104. The two encryption units may be communicatively coupled.

The encryption unit 102-104 may be communicatively coupled to the communication via a one-way connection for providing an instruction to the communication unit 106. The computing unit 108 may be configured for storing a plurality of identifier lists. The plurality of identifier lists may include the identifier list. The plurality of identifier lists may be a static list of N-numbers of identifiers.

The computing unit 108 may be configured for obtaining device information associated with the device 110. The device information includes an indication of a network (such as an Ethernet network, a Wi-Fi network, a CDMA (Code Division Multiple Access)-based network, a GSM (Global System for Mobile Communications)-based network, a LTE (Long-Term Evolution)-based network, a 5G/4G-based network, a SATCOM (satellite communication) based network, etc.) to which the device 110 may be connected. The computing unit 108 may be configured for analyzing the at least one device information. The computing unit 108 may be configured for determining a characteristic of the device 110. The characteristic specifies the network to which the device is connected. The computing unit 108 may be configured for identifying the at least one identifier list from the plurality of identifier lists based on the characteristic of the device 110. The low-observable encryption device 100 may be integrated within the device 110.

Figure 7:
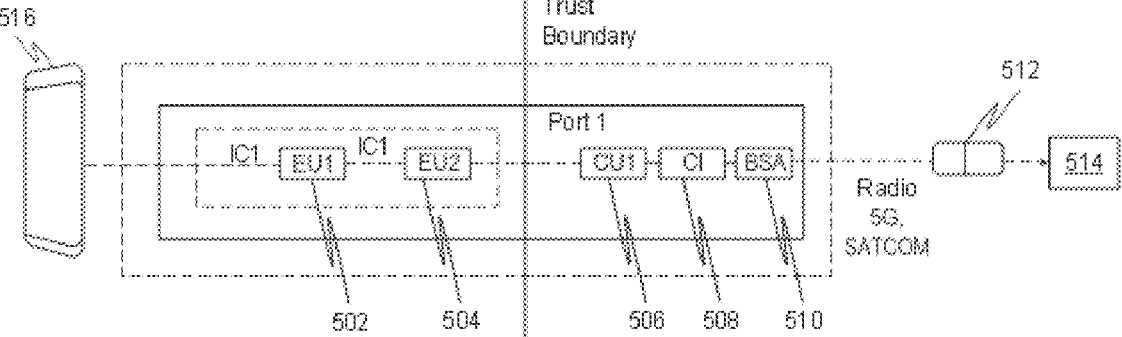
FIG. 7 is a sectional view of components of an embodiment of a system.

FIG. 7 is a schematic diagram of a low-observable encryption device 500 for facilitating communications, in accordance with some embodiments. The low-observable encryption device 500 may include an encryption unit 502-504, a communication unit 506 communicatively coupled with the encryption unit 502-504, a compute infrastructure 508 communicatively coupled with the communication unit 506, and a beam steering antenna 510 coupled with the compute infrastructure 508. The low-observable encryption device 500 may be associated with a trust boundary dividing the low-observable encryption device 500 into a trusted environment and an untrusted environment. The trusted environment is on the left of the trust boundary and the untrusted environment is on the right of the trust boundary. The encryption unit 502-504 is on the left of the trust boundary and the communication unit 506, the compute infrastructure 508, and the beam steering antenna 510 are on the right of the trust boundary. The encryption unit 502-504 may be communicatively coupled with a device (such as a smartphone, a laptop, etc.) 516 on the left of the trust boundary. The compute infrastructure 508 is connected with an external encryption device (Isidore Quantum™ device commercially available from ForwardEdge AI of San Antonio, TX) 512 using the beam steering antenna 510 on the right of the trust boundary via communication networks (such as Radio, 5G, SATCOM, etc.). The external encryption device 514 may be communicatively coupled with an external device (such as a smartphone, a laptop, etc.) 514.

The encryption retransmission device includes at least one encryption unit and a communication unit. The encryption retransmission device may include galvanic isolation to isolate data and power pins between encryption units and the communication units of the encryption retransmission device to protect against attacks such as PowerHammer. The galvanic isolation is provided using a galvanic isolator. The galvanic isolator includes an opto-coupler, a magneto-coupler, a piezo-couple, an opto-emulator, a transformer, a decoupling capacitor, an optoisolator, a digital isolator, a signal isolation transformer, an isolation amplifier, a signal transfer device having a transmitter and a receiver that are electrically isolated from one another and exchange signals such as optical, radio, ultrasound signals, etc. The encryption retransmission device may include a resin enclosure comprised of a resin, such as an epoxy resin, and encloses the encryption retransmission device. The resin absorbs heat therefore the resin enclosure does not radiate the heat. The encryption retransmission device may include a network interface module (NIM) that on-boards all communication interfaces onto a PCB (printed circuit board) comprising the encryption units and communication units, connecting through the communication units to maintain a protocol break, thus allowing for wireless communications. The encryption units and the communication units are computing devices. The PCB is encased in resin to prevent tampering and protect against BitWhisper (heat emission) attacks. Further, the encryption retransmission device may also include an Anomaly Detector (AD) (or anti-tamper) that uses three different algorithms acting independently to detect anomalies that may signal an attack. The algorithms of the AD use multi-variant signal analysis.

The AD is capable of warning an operator and also executing an "immune system" type of response. Further, the encryption retransmission device may also include an inner case (Faraday Cage) to limit the leaking of radio signals from the encryption retransmission device, and further prevent access by an attacker. The encryption retransmission device may also include a custom resin/plastic outer case to allow integration into multiple use cases. The encryption retransmission device also provides a four-hour backup battery operation. The inner cage of the encryption retransmission device may be Extruded Aluminum Inner Case that houses the PCB And acts as a Faraday cage. The anomaly detector may include a Raspberry Pi4 loaded with a software application. A case of the anomaly detector is designed to be interlocked with the outer case of the encryption retransmission device (Isidore device) forming an Isidore Quantum™ device which is commercially available from Forward Edge AI of San Antonio, TX.

The encryption retransmission device includes an embedded software application. The anomaly detector may include multiple models such as Azure Anomaly Detector, Anomaly-Transformer, Anomaly Autoencoder, GLocalKD, STL, and RDP. Each AD will have three different models working independently to detect anomalies.

An aggregator determines an attack based on the outputs of the three models. Further, the models are randomly installed on each AD. The PFED incorporated in the disclosed system may be an encrypting device. Two encrypting devices are paired to provide communications between two trusted elements via an untrusted network. Any device in a network address space may be a trusted element. The network address space may be a subnet in an enterprise network. The device may include a smartphone, a tablet, a laptop, a desktop, a router, or other devices in a network address space.

Each of the trusted elements includes an interface for receiving a trusted interconnect and providing a wired connection between the two encrypting devices and the trusted element, thereby providing communications between the trusted element and the encrypting device. The encrypting devices are associated with the trusted elements via trusted interconnects. The two encrypting devices need to be paired to allow communication between the trusted elements.

Each sending trusted element generates native packets to be received by another trusted element. The native packets may take any form that would allow the native packets to normally travel between the trusted elements without encrypting devices. The native packets may include a data packet riding in a frame, an IP packet riding in an Ethernet frame, etc. Each of the encrypting devices may include an encryption unit and a communication unit linked to the encryption unit via a connectionless interconnect provided by a bus. The connectionless interconnect utilizes a point-to-point connectionless protocol for the transmission of messages between the encryption unit and the communication unit. This point-to-point connectionless interconnect simply sends messages between the encryption unit and the communication unit. No arrangement (such as a handshake) is made between the encryption unit and the communication unit before messages are sent. Each encryption unit is configured with a key for encrypting and decrypting messages. For trusted elements to communicate, the encryption unit's keys of the two encrypting devices must match.

The encryption devices include interfaces and a one-way interface. Each interface may include an Ethernet port, a serial port, or a USB port. The interfaces may be in communication with the trusted element interface of the trusted element via the trusted interconnect, e.g., an Ethernet cable, a serial wire, or a USB cable. The interfaces are not associated with an address. The interfaces are not addressable and therefore, the messages are treated strictly as data, not as network packets before processing by the encryption unit.

The one-way interface may include a GPIO pin, a twisted pair wire, etc. The one-way interface allows for instructions generated by the encryption unit to be signaled to the communication unit. The instructions may instruct the communication unit to halt operations.

The passive interface and an active/addressable interface are both included in each communication unit. Through the connectionless interconnection, the passive interface of the communication unit of one encrypting device is in contact with the second passive interface of the encryption unit of the other encrypting device. The address is linked to the active/addressable interface. To transmit any packets from the passive interface into a form that will be routable to the other communication unit of the paired PFED, the communication unit of one encrypting device is paired with communication unit of the other encrypting device. The Internet or other untrusted networks are used for communications between communication units. The native packet is also created by one trusted element and sent to the other as part of the communications between the trusted elements. The native packet could be an Ethernet frame, for instance, and could have a frame header containing the source and destination addresses. Through the trusted interconnect and the encryption unit's interface, the native packet is sent to the other encryption unit of the other encrypting device. The encryption unit ingests the entire native pack (including the frame header and the payload) when it receives the native packet and encrypts the entire native packet using the encryption key. To create an outgoing connectionless datagram, the encryption unit additionally adds a connectionless header to the encrypted native packet. An atomic, stateless datagram is the connectionless datagram.

Fields indicating message boundaries (such as length, character count, size, etc.) or other static properties of the message may be included in the connectionless header. Using pre-established criteria connected to the fields of the connectionless header, the receiver is free to accept or reject a frame regardless of the connectionless datagram's contents. The connectionless header may also contain fields like the length. The maximum length of the frame that the receiver (i.e., the encryption unit or the communication unit) will accept may be bound by a pre-specified constant. The receiver may safely discard the connectionless datagram if its size exceeds the predetermined maximum length, as determined by the receiver. The connectionless header does not contain any dynamic properties, so the receiver can process a frame without keeping track of any previous state data. This greatly simplifies the logic and state machine needed by the receiver to correctly process the connectionless header. Human inspection is capable of reaching a known termination in each state. The ability to assess the security boundary logic for certification and correctness is significantly improved as a result.

The untrusted network can comprehend the intricate header, which permits the delivery of the packet to the paired communication unit. The complex header, for instance, contains both a source address and a destination address. Dynamically defined fields may also be present in the complex header. In order to deliver the packet to the paired communication unit (the communication unit of the encrypting device), the untrusted network routes the packet as necessary. A connectionless header is added to the connectionless datagram to create an incoming connectionless datagram after the communication unit of the encrypting device removes the complex header added by the communication unit and receives the packet. The connectionless header may have fields indicating message boundaries (such as length) or other static properties of the message, as previously mentioned.

A trust boundary between the trusted environment (trusted network) and the untrusted environment (untrusted network) is created by the encryption device pair, which offers a cryptographically paired, point-to-point link that enforces logical and physical isolation. By placing independent devices at the endpoints of the connectionless interconnect (i.e., the communication unit and the encryption unit), the physical isolation is achieved. The communication unit handles the intricate native untrusted network processing independently from the encryption unit's straightforward connectionless network processing. By converting the untrusted native packet sent to the active/addressable interface into a connectionless packet, the logical isolation is achieved. The native packet is always encrypted before it passes from the trusted element to the communication unit and is cryptographically authenticated by the encryption unit of the paired encrypting device before it is allowed to pass to the trusted element.

An entity situated on the communication unit side of the connectionless-interconnect cannot create a packet that has meaning for the trusted element unless the key is known to that entity since all packets arriving at the trusted element must be received via the encryption unit. An encrypting device pair, or encrypting device pair, establishes a tunnel across the untrusted network to connect two devices in trusted spaces via a virtual wire through untrusted spaces. The environments that are trusted and untrusted are totally separate from one another. No information is shared about the other. This is meant by "protocol-free." Networking and encryption "protocols" are separate from one another. Additionally, the encryption units are set up to send inter-PFED control messages so they can communicate with one another.

The cryptographic state of the encryption units is managed by means of these inter-PFED control messages. In order to rekey, manage the cryptographic algorithm, manage the status of the encryption units (e.g., log, online/offline, etc.), start a new session, etc., the PFED's encryption unit may also generate an inter-PFED control message for delivery to the PFED's encryption unit. These inter-PFED control messages are packetized as connectionless packets and travel along the same PFED-to-PFED tunnel as the native packets originating at the trusted element, but they are identified as control messages. They originated at the encryption unit, encrypted by the encryption unit using a key, packetized, and sent along the PFED-to-PFED tunnel. The inter-PFED control messages are not sent to the trusted element because they are marked as control messages.

Embodiments herein may be beneficial for a low-observable encryption device for a smartphone. The low-observable encryption device encrypts communications associated with the low-observable encryption device in a way that cannot be broken even via a quantum computer. The low-observable encryption device prevents the detection of the encrypted traffic associated with the low-observable encryption device. The low-observable encryption device obfuscates its location.

The low-observable encryption device may include encryption units and a communication unit. Further, the low-observable encryption device may include a compute infrastructure (CI) connected to the communication unit. The CI includes a static list of N (e.g., 100,000) MEID numbers, a static list of N (e.g., 100,000) MAC numbers, a static list of N (e.g., 1,000) UDP port numbers, etc. The low-observable encryption device and an external encryption device (such as an Isidore™ quantum device, an encryption retransmission device, an external low-observable encryption device, etc.) establish an SSL session and exchange 100 MEID, 100 MAC, and 100 ports during the initial setup between the low-observable encryption device and the external encryption device. The low-observable encryption device and the external encryption device have knowledge of the MEID, MAC, and UDP ports selected. After a specified time interval, the CI in the low-observable encryption device and the external encryption device (e.g., every 20 mins), will transition to the next MEID, MAC, and UDP Port combination on the agreed list. This regular transition gives an appearance of different devices connecting to the network to someone trying to eavesdrop on the communications associated with the low-observable encryption device and the external encryption device. This transition renders an attack initiated on a specific UDP port (e.g., UDP port X) ineffective because the low-observable encryption device and the external encryption device would switch to UDP Port Y before the attack is completed. The CI also adds basic HTML5 headers and MIME declarations to embed the encrypted payload (packets) from the CU1 (communication unit). This addition makes the packet resemble normal web traffic and does not raise suspicion for an adversary that may inspect the packets. The technique of making the packet resemble normal web traffic would also defeat methods used to detect a VPN. Further, the CI includes Anomaly Detector (AD) software to learn the patterns of life associated with the low-observable encryption device. For example, if a large number of packets is dropped by CU1, the AD detects this event and initiates the next interval (second bullet) for the communications as an immune response.

If the anomaly detector detects and anomaly, it can invoke an immune response. The immune response mechanism is an internal application programming interface in an encryption device that is called from the anomaly detector. Once the immune response is invoked, the device will change its mode of operating to thwart off an attack. Possible types of immune responses are:

Change/Spoof the device's MAC address,
Change/Spoof the device's IMEI number,
Change/Spoof the device's IP address,
Change the ports on which the device communicates,
Change the protocols over which the device communicates.

An immune response can be any one of the above or a combination of the above.

The low-observable encryption device may include a beam steering antenna (BSA) or a beam forming antenna connected to the CI. The BSA may include a beam forming phase array on a metal case. The beam forming phase array may be integrated into the metal case. The metal case houses a PCB board comprising the encryption units (EU1 and EU2), the communication unit (CU1), and the compute infrastructure (CI). The PCB board is electrically connected to the metal case.

The metal case comprising the beam forming phase array forms the BSA. The printed circuit board connects to the metal case which is the antenna via a cable. Further, the metal case is housed in an outer resin case. The BSA and CI integrate with the Isidore Quantum device or Isidore device for forming the low-observable encryption device. The CI (a SoC) includes software that alters the power and angle of the broadcast using the beam forming antenna to defeat triangulation and trilateration used to geolocate a device (such as a smartphone) on a cellphone network. By alternating the signal power and angle of transmission, the device would appear 500 meters away from the device's actual location and in motion. The "speed of motion" of the device can be controlled by a rate of signal and power change. Further, the low-observable encryption device creates a solution that is very difficult to detect, geo-track, and intercept. The encryption provided by the low-observable encryption device is quantum resistant, so even if the communications of the low-observable encryption device can be detected and intercepted they cannot be decrypted, even with a super computer.

The BSA may facilitate low-probability-of-intercept (LPI) or low-probability-of-detect (LPD) communications using the beamforming phase arrays with rapid side lobe time modulation (SLTM). The beamforming phase arrays provide time-varying side-lobes while maintaining a fixed main-lobe pattern. The signal radiated through the main-lobe of the aperture will not be distorted but the signal radiated through its side lobes will be irrecoverably scrambled in a manner similar to spread spectrum communications. The beamforming phase arrays may be a plurality of antenna elements. A phase of one antenna element is sequentially inverted to generate a plurality of modes corresponding to the plurality of antenna elements and another element with the inversed phase combines with its symmetrical element forming a pair of elements. The fields of the pair elements cancel out in the broadside direction and influence the undesired (sidelobe) direction. Therefore these pair of elements change the total field in the undesired directions and keep the main lobe unaltered.

Figure 8:
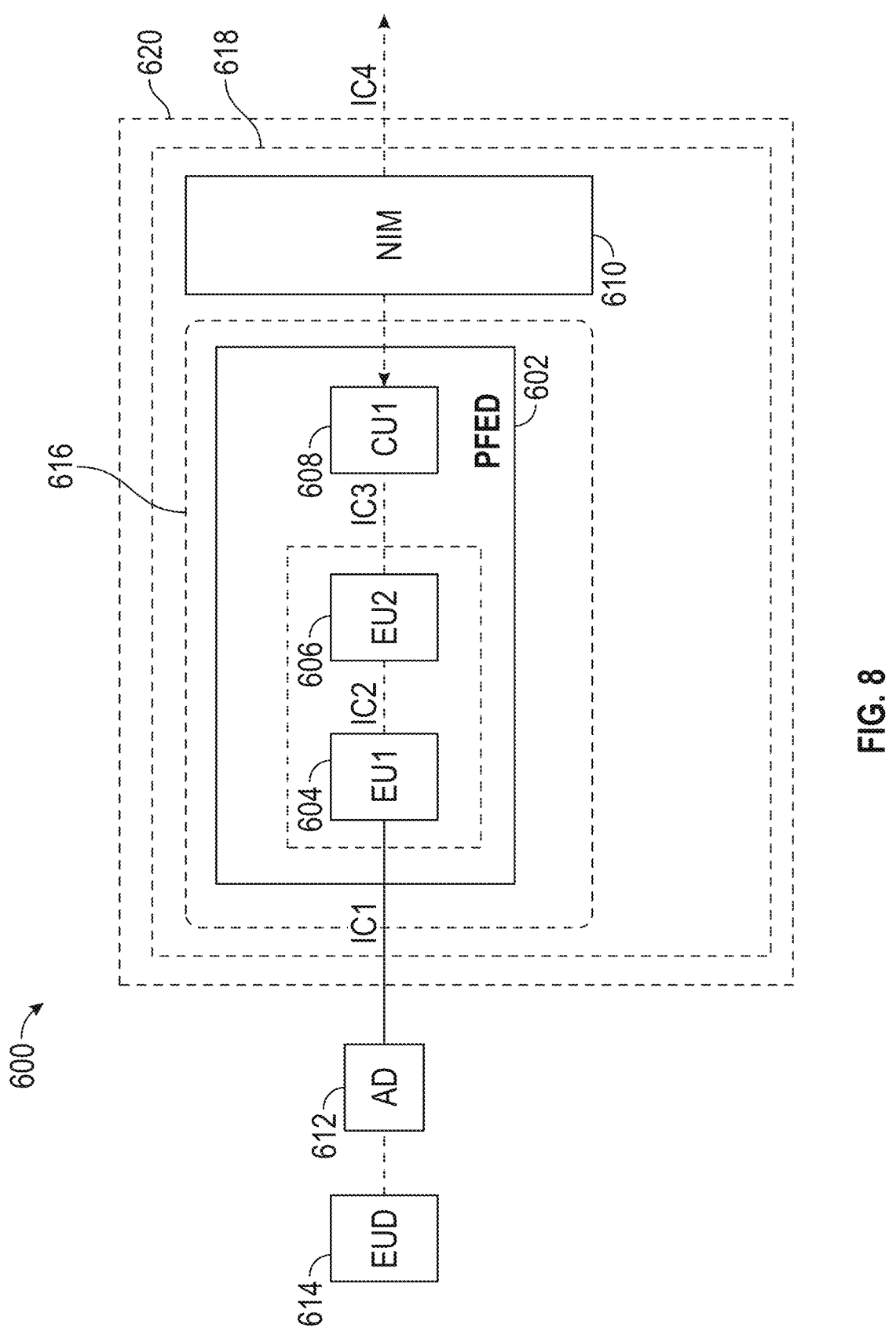
FIG. 8 is a sectional view of components of an embodiment of a system.

FIG. 8 is a sectional view, a block diagram of an encryption retransmission device 600 for providing resiliency against attacks with an anomaly detector (AD) 612 in accordance with some embodiments. The encryption retransmission device 600 may be an Isidore Quantum device commercially available from Forward Edge AI of San Antonio, TX. The encryption retransmission device 600 may include a protocol free encryption device (PFED) 602 and a network interface module (NIM) 610. The network interface module (NIM) 610 may include an Ethernet interface, a USB interface, a Wi-Fi interface, a radio interface, a SATCOM interface, a Bluetooth interface, etc. The protocol free encryption device (PFED) 602 may include a first encryption unit (EU1) 604 and a second encryption unit (EU2) 606, and a communication unit (CU1) 608. The protocol free encryption device (PFED) 602 and the galvanic isolator 616 may be encased inside a Faraday cage 618. The protocol free encryption device (PFED) 602, the galvanic isolator 616, and the Faraday cage 618 may be encased inside an outer resin or plastic cage 620. The encryption retransmission device 600 may be associated with an external user device 614. In an embodiment, the anomaly detector (AD) 612 may be physically located anywhere on a network connecting the encryption retransmission device 600 and one or more other encryption retransmission devices. The encryption retransmission device 600 and one or more other encryption retransmission devices may be cryptographically bounded.

In some embodiments, the CU1 601 may include a (NID) Network Interface Device also referred to as the FrontEnd. The NID is on the black side of the board which is the untrusted zone of the board. In some embodiments, the NIM acts as a switch or router that goes in between the two boards. Some embodiments may engage an ethernet cable. The switch resides between the two boards, allowing the boards to pick up the network data. The ethernet may be serial, wifi, Bluetooth, USB, Radio, or SATCOM.

Figure 9:
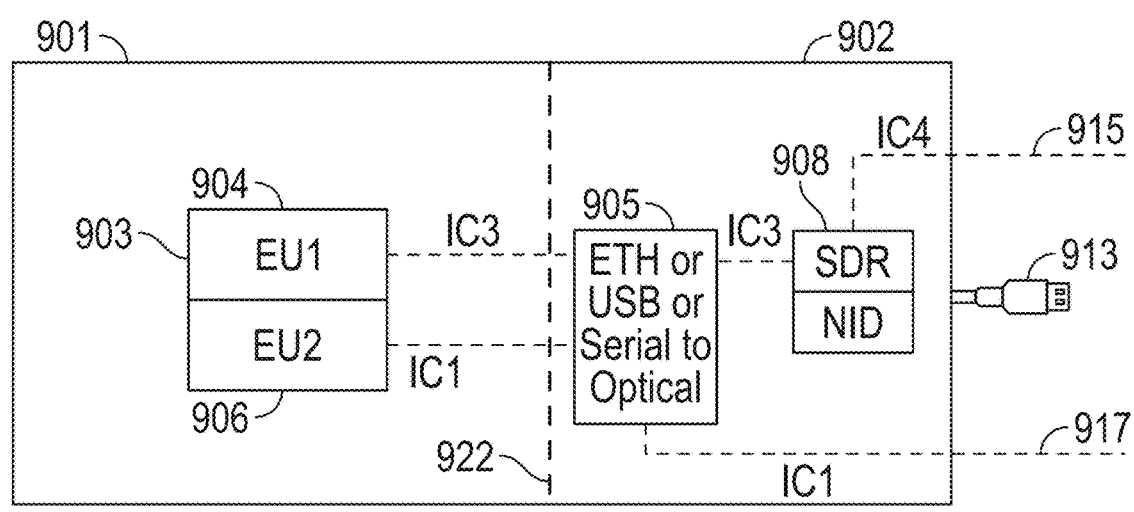
FIG. 9 is a sectional view of components of an embodiment of a system.

FIG. 9 is a sectional view of components of an embodiment of a system 900. There is a main, "mother," board 901 engaged with an interchangeable, "daughter," board 902. The main board 901 remains fixed to house encryption tasks including two encryption units, EU1 Function 1 904 and EU2 Function 2 906 on one neuromorphic chip 903 commercially available from Coherent Logix of Austin, TX with two optical interfaces, IC1 and IC3. In some embodiments, the neuromorphic chip may be any electronic chip. The interchangeable board 902 includes an electrical to optical converter 905 and a neuromorphic chip 908 that includes an software-defined radio receiver and network intrusion detector. The converter 905 and chip 908 communicate with each other over IC3 on the interchangeable board 902. The converter 905 communicates with the system's input via IC1 and requires galvanic or other isolation for power, ground, and data between IC1 and IC3. If the electrical to optical converter 905 has memory, it cannot be shared with any other chip. The neuromorphic chip 908 on the interchangeable board 902 communicates with the system's output 915 via IC4. The interchangeable board 902 is powered via USB power 913. The output 915 may be ethernet, USB, serial, Wi-Fi, or radio. The input 917 may be ETH/PoE, USB, or serial data. The output 915 and input 917 may vary depending on the circumstances. Both of the neuromorphic chips 903 and 908 require flash memory, SD card, and UART (debug port). The chips 903 and 908 may not share memory.

Figure 10:
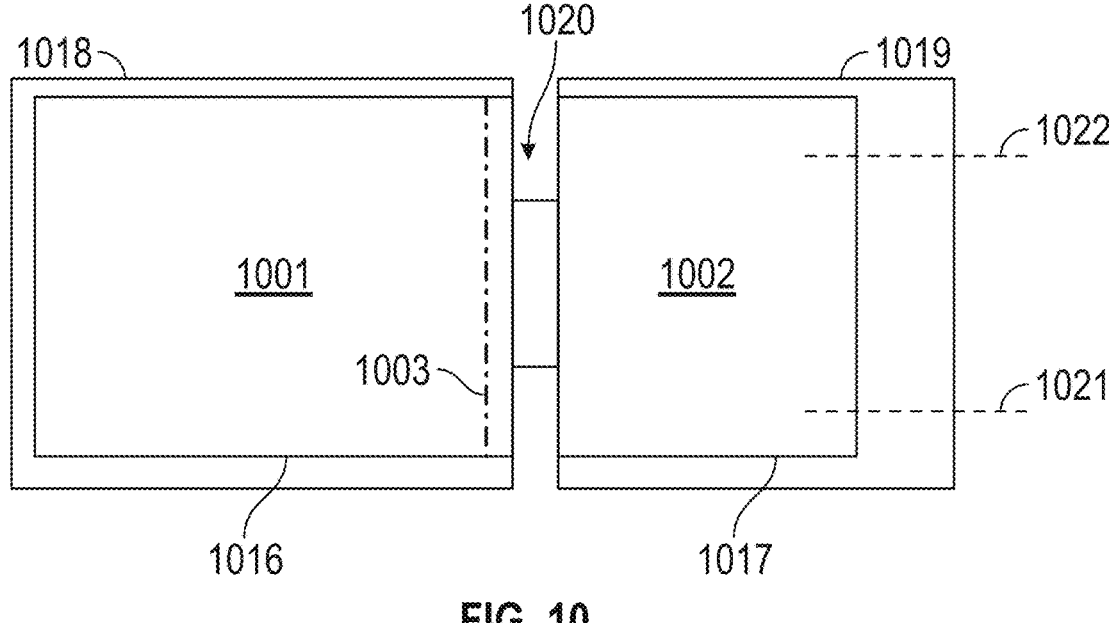
FIG. 10 is a sectional view of components of an embodiment of a system.

The trust boundary of FIG. 7 as discussed above is similar to the trust boundary 922 of FIG. 9. Next, FIG. 10 shows a sectional view of a main, "mother," board 1001 engaged with an interchangeable, "daughter," board 1002. The trust boundary of FIGS. 7 and 9 is similar to the trust boundary 1003 of FIG. 10. FIG. 10 also shows how a housing 1018 encapsulates the main board 1001 and a separate, distinct housing 1019 encapsulates the interchangeable board 1002. The housings 1018 and 1019 may include an outer resin or plastic cage. The inner boundaries 1016 and 1017 may include a Faraday cage or galvanic isolator or both. The interconnects IC1 and IC3 and isolated power (combined and shown as arrow 1020) and electrical to optical converter 1004 are the only components that extend across both board's housings 1018, 1019. The interchangeable board 1002 also has interconnects to IC1 and input 1021 and IC4 and output 1022 which are both ethernet in FIG. 10. The housings for both boards may also have distinct anti-tamper exterior surfaces that are not shared across both boards. The HAMMOND enclosure includes a rail system that would provide the scaffolding for both boards when connected.

This design that relies on main and interchangeable boards moves most of what encryption workflow was done from hardware components to software defined functions. This enables one to move data at "chip speed." That is, the handling, routing, and encryption of network packets from the operating system's user space to a neuromorphic processor, which allows one to handle the network packets and all related encryption and management thereof, as software defined functions, directly on the processor.

Next, this design that relies on main and interchangeable boards has swappable interconnects which means that the core encryption never changes. The swappable interface board keeps the encryption component across the trust boundary the same for every version. With a common isolation system on the encryption board, one may then swap out interface boards with any kind of interface that complies with the isolation scheme. As a result, the number of interfaces are unlimited. For example, designs without an interchangeable board have the ability to interface via WIFI, USB, and ETH. With the interchangeable board we may use an RS232, RSXXX, optical, or any other interface. The interchangeable board achieves the swappable interconnect providing the interface to the network. The interface between the main encryption board and the interchangeable board will be a standard interface. Each interchangeable board will provide different protocol capability such as ethernet, USB, Serial, etc.

Figure 11:
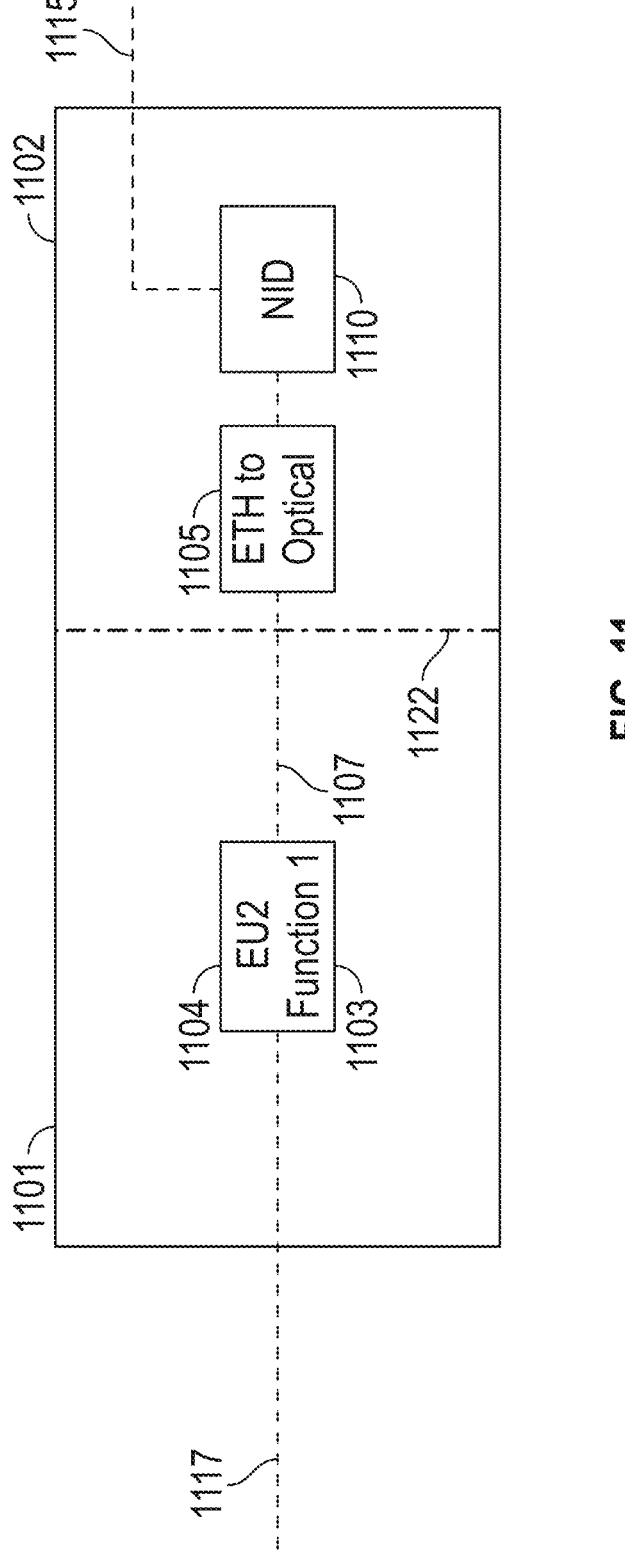
FIG. 11 is a sectional view of components of an embodiment of a system.

In some embodiments, the interchangeable board may include a communication unit, computing unit, and network interface module. FIG. 11 shows a system 1100 with a main, "mother," board 1101 engaged with an interchangeable, "daughter," board 1102. The main board 1101 remains fixed to house encryption tasks including an encryption unit, EU2 Function 1 1103 on one neuromorphic chip 1104 commercially available from Coherent Logix of Austin, TX with interfaces 1117 and 1107. The interchangeable board 1102 includes an electrical to optical converter 1105 and a neuromorphic chip 1110 that may include an software-defined radio receiver and network intrusion detector. The converter 1105 and chip 1110 communicate with each other over an interconnect on the interchangeable board 1102. The converter 1105 communicates with the system's input via and interconnect and requires galvanic or other isolation for power, ground, and data between 1117 and 1115. If the electrical to optical converter 1105 has memory, it cannot be shared with any other chip. The neuromorphic chip 1110 on the interchangeable board 1102 communicates with the system's output 1115 via IC4. The main board 1101 is powered via USB power in some embodiments. The output 1115 may be ethernet, USB, serial, Wi-Fi, or radio. The input 1117 may be ETH/PoE, USB, or serial data. The output 1115 and input 1117 may vary depending on the circumstances. Both of the neuromorphic chips 1103 and 1110 require flash memory, SD card, and UART (debug port). The chips 1103 and 1110 may not share memory. The trust boundary 1122 endures.

This disclosure is not limited to the particular systems, devices, and methods described, as these may vary. The terminology used in the description is for the purpose of describing the particular versions or embodiments only, and is not intended to limit the scope.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, may be apparent from the foregoing descriptions. Such modifications and variations are intended to fall within the scope of the appended claims. The present disclosure is to be limited only by the terms of the appended claims, along with the full scope of equivalents to which such claims are entitled. This disclosure is not limited to particular methods or systems, which can, of course, vary.

The terminology used herein is for the purpose of describing particular embodiments only, and is not intended to be limiting.

With respect to the use of substantially any plural or singular terms herein, one may translate from the plural to the singular or from the singular to the plural as is appropriate to the context or application. The various singular and plural permutations may be expressly set forth herein for sake of clarity. In general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. If a specific number of an introduced claim recitation is intended, such an intent will be explicitly recited in the claim, and in the absence of such recitation no such intent is present.

In addition, where features or aspects of the disclosure are described in terms of Markush groups, the disclosure is also thereby described in terms of any individual member or subgroup of members of the Markush group.

Various of the above-disclosed and other features and functions, or alternatives thereof, may be combined into many other different systems or applications. Various presently unforeseen or unanticipated alternatives, modifications, variations, or improvements therein may be subsequently made, each of which is also intended to be encompassed by the disclosed embodiments.

The invention claimed is:

1. A low-observable encryption device, comprising:
an encryption unit configured to
encrypt an egressing native packet using an encryption key,
create an encrypted egressing native packet, and
add a connectionless header to form an egressing connectionless datagram;
a communication unit configured to
couple and communicate with the encryption unit,
receive the egressing connectionless datagram, and
add a complex header to the egressing connectionless datagram to form an egressing packet; and
a computing unit configured to
couple and communicate with the communication unit,
establish a communication session between the computing unit and an external computing unit of an external encryption device,
transmit an identifier list comprising an identifier, a number of identifiers, and an identifier selecting parameter,
select an identifier from the identifier list,
receive the egressing packet from the communication unit, and
forward the egressing packet to the external computing unit through a path identified from a plurality of paths for a time interval based on the identifier list and the identifier selecting parameter,
wherein a microprocessor comprises two encryption units.

2. The device of claim 1, further comprising an interchangable device.

3. The device of claim 2, wherein the interchangable device comprises a computing unit and a software defined radio.

4. The device of claim 2, wherein the interchangeable device comprises an electrical to optical converter.

5. The device of claim 2, wherein the interchangeable device is on the same side of a trust barrier as interconnects IC1 and IC3, an isolated power, and an electrical to optical converter.

6. The device of claim 2, wherein power is delivered by a USB port.

7. The device of claim 2, wherein an input interconnect comprises an Ethernet interface, a USB interface, a Wi-Fi interface, a radio interface, a SATCOM interface, or a Bluetooth interface.

8. The device of claim 2, wherein an output interconnect comprises an Ethernet interface, a USB interface, a Wi-Fi interface, a radio interface, a SATCOM interface, or a Bluetooth interface.

9. The device of claim 2, wherein an output interconnect to the interchangeable device comprises an Ethernet interface, a USB interface, a Wi-Fi interface, a radio interface, a SATCOM interface, or a Bluetooth interface.

10. The device of claim 1, wherein the encryption units, communication unit, and computing unit are on one side of a trust barrier.

11. The device of claim 1, wherein the microprocessor, interconnects communicating with the microprocessor, Faraday cage, and galvanic isolator are on the same side of a trust barrier.

12. A system, comprising:

a low-observable encryption device, comprising an encryption unit configured to encrypt an egressing native packet using an encryption key, create an encrypted egressing native packet, and add a connectionless header to form an egressing connectionless datagram;

a communication unit configured to couple and communicate with the encryption unit, receive the egressing connectionless datagram, and add a complex header to the egressing connectionless datagram to form an egressing packet;

a computing unit configured to couple and communicate with the communication unit, establish a communication session between the computing unit and an external computing unit of an external encryption device, transmit an identifier list comprising an identifier, a number of identifiers, and an identifier selecting parameter, select an identifier from the identifier list, receive the egressing packet from the communication unit, and forward the egressing packet to the external computing unit through a path identified from a plurality of paths for a time interval based on the identifier list and the identifier selecting parameter; and an interchangable device.

13. The system of claim 12, wherein a microprocessor comprises two encryption units.

14. The system of claim 13, wherein the microprocessor, interconnects communicating with the microprocessor, Faraday cage, and galvanic isolator are on the same side of a trust barrier.

15. The system of claim 12, wherein the interchangeable device comprises a computing unit and a software defined radio.

16. The system of claim 12, wherein the interchangeable device comprises an electrical to optical converter.

17. The system of claim 12, wherein the encryption units, communication unit, and computing unit are on one side of a trust barrier.

18. The system of claim 12, wherein the interchangeable device is on the same side of a trust barrier as interconnects IC1 and IC3, an isolated power, and an electrical to optical converter.

19. The system of claim 12, wherein power is delivered by a USB port.

20. The system of claim 12, wherein an input interconnect to the interchangeable device comprises an Ethernet interface, a USB interface, a Wi-Fi interface, a radio interface, a SATCOM interface, or a Bluetooth interface.

* * * * *